Patented Mar. 24, 1942

2,277,512

UNITED STATES PATENT OFFICE 2,277,512

CATALYST

Martin de Simó, Piedmont, and Frank Matthew McMillan, Berkeley, Calif., assignors to Shell Development Company, San Francisco, Calif., a corporation of Delaware No Drawing. Application August 28, 1939, Serial No. 292,295

7 Claims. (Cl. 252—211)

The present invention relates to new and improved catalytic agents comprising aluminum halides.

The catalyzation of chemical reactions by solid catalysts takes place, as is known, principally on the surface of the catalyst; consequently, when employing a solid catalyst, the catalytic activity is, in general, proportional to the amount of available surface present. In many cases the catalytic material per se possesses only small available surface and, hence, shows a low catalytic activity. In such cases it is common practice to apply the catalytic material to a "carrier" or "supporting material," such, for example, as pumice, chamotte, kieselguhr, activated charcoal, silica gel, and the like, which, in general, possess a large surface. Some of these carriers or supporting materials, such as silica gel, activated carbon, etc., have a fine porous structure and possess an enormous "inner surface." Such materials are usually capable of absorbing large amounts of gases, vapors, liquids, colloidal materials, etc., and may even catalyze certain reactions, presumably by the so-called physical catalytic action.

The application of various catalytically active materials to suitable carriers or supporting materials may be advantageous in several respects. The catalytic activity may be increased due to the increased surface, smaller volumes of catalyst and/or smaller converters may be employed, the production capacity may be increased, and the cost of the catalyst may usually be reduced. Many catalytically active materials possess sufficient activity but are of a form or character unsuitable for use per se. The application of such materials to carriers may be of advantage if it permits the catalyst to be employed under conditions and in manners which would ordinarily be unsuitable or less practical. Thus, for example, by applying phosphoric acid to a suitable carrier, it can be much more easily handled and can be employed at higher temperatures, etc., than it otherwise could.

While the primary purpose of the use of a carrier or supporting material is to increase the available surface of the catalytic agent, decrease the cost of the catalyst, and/or to produce a catalyst which may be more conveniently handled and/or employed, it is known that in certain cases the carrier or supporting material also exerts a promoting effect upon the catalytic activity of the catalyst. This promoting effect of the carrier acts sometimes to promote the catalytic activity as a whole and sometimes to promote the catalytic activity with respect to a certain type of reaction. Thus, it is well known that particular catalytic materials when applied to different carriers or supporting materials may behave as distinct and different catalytic agents. For example, chromium oxide applied to alumina is an excellent catalyst for the cyclization of hydrocarbons, while the same chromium oxide applied to majolica chips is practically inactive in hydrocarbon cyclization reactions.

The aluminum halides constitute a well-known class of catalytic agents. These catalysts, especially aluminum chloride and aluminum bromide, are capable of catalyzing a large number of reactions and find considerable application in the alkylation of isoparaffins with olefins, the isomerization of saturated hydrocarbons, the polymerization of olefins, the cracking of hydrocarbons, the Friedel-Crafts reactions, and the like. In many of the reactions using these catalysts, a large surface is not essential since the aluminum halides are soluble to a certain extent in many of the liquid reaction mixtures and in such cases they do not act entirely as heterogeneous catalysts. However, in view of the physical and chemical properties of the aluminum halides, it is often advantageous to employ them in combination with a suitable carrier or supporting material. Supported aluminum halide catalysts are more easily handled, cheaper, and more convenient to use in vapor phase reactions.

We have found certain new combinations of anhydrous aluminum halides and carrier materials which possess remarkable catalytic activity and are exceptionally desirable catalysts.

We have found that the catalytic activity of the aluminum halides is considerably increased when in combination with certain forms of alumina. The effect of the alumina when in combination with an anhydrous aluminum halide is unique, very pronounced, and not approached by any of the many other carrier and supporting materials which we have tried. The promoting action to which we refer is, moreover, not general to all of the many forms of alumina, but is practically confined to the specific type of alumina more fully described below.

The type of alumina which we have found to produce execeptionally desirable catalysts when combined with anhydrous aluminum halides and which is employed in the catalysts of the invention is a special and distinct type of alumina which we designate "crystalline alumina alpha monohydrate prepared by partial dehydration of crystalline alpha alumina trihydrate." In the precipitation of alumina by the usual methods such, for instance, as the precipitation of alumina from solutions of an aluminum salt with an alkali, the alumina is deposited in the form of a collidal precipitate of substantially amorphous alumina. These amorphous alumina precipitates contain large amounts of bound and occluded water and have no adsorptive properties. By subjecting these aluminas to a suitable heat treatment the water is driven out and fine pores are opened up. The material after such a treatment has excellent adsorptive properties. This heat treatment is commonly referred to as activation, and the adsorptive alumina so prepared is commonly referred to as activated or active alumina.

If the precipitation of the alumina is effected slowly from a sodium aluminate solution under proper conditions a more or less crystalline alumina trihydrate may be produced. There are two forms of alumina trihydrate, namely, the alpha trihydrate and the beta trihydrate. Although these materials are referred to as trihydrates, it is now known that they are not true hydrates but have a hydroxide structure. Infra-red absorption studies on alpha trihydrate, for example, have failed to show the existence of a water band in the spectrum but have, on the other hand, shown a hydroxyl band at 3 mu. Furthermore, the crystal structure of the alpha trihydrate indicates that all of the oxygen atoms in the lattice are equivalent. These findings indicate that the crystalline trihydrates are true hydroxides [Al(OH)$_3$] rather than oxide hydrates (Al$_2$O$_3$·3H$_2$O). The beta trihydrate is easily prepared by precipitation from sodium aluminate solutions. Its formation is favored by relatively rapid precipitation, precipitation at room temperature and low concentrations of alkali. The alpha alumina trihydrate is likewise prepared from the sodium aluminate solutions but requires somewhat different conditions and requires that sodium aluminate solution be seeded with alpha alumina trihydrate crystals. The formation of the alpha alumina trihydrate is favored by very slow precipitation, elevated temperatures and high caustic concentrations. The special alumina used in the preparation of the catalysts of the present invention is prepared from this latter material, namely, "crystalline alpha alumina trihydrate," by partial dehydration. The partially dehydrated materials consist essentially of "crystalline alumina alpha monohydrate" but usually contain some gamma alumina in a finely divided form.

At present the commercial source of "crystalline alumina alpha monohydrate prepared by partial dehydration of crystalline alpha alumina trihydrate" is the special product produced by the Aluminum Ore Company and sold under the trademark "Activated Alumina." This material is obtained in a limited quantity as a by-product in the Fickes-Sherwin modification of the Bayer process. In this process sodium aluminate liquors containing particles of hydrated alumina in suspension are agitated in large tanks with the result that the sodium aluminate is decomposed and the aluminum precipitated as a hydrated alumina. During the process, which is cyclic and continuous, deposits of particularly hard crystalline alpha alumina trihydrate form on the tank walls. These deposits are removed from time to time with pneumatic drills, broken up into pieces of the desired size, and partially dehydrated by heating at a temperature between about 300° C. and 800° C., preferably in a current of inert gas or in vacuo. Preparation of this material is more fully described and claimed in United States Patent 1,868,869. This material which is an excellent "crystalline alumina alpha monohydrate prepared by partial dehydration of crystalline alpha alumina trihydrate" usually contains a certain amount of impurities derived from the sodium aluminate solution. A typical analysis is, for example:

|  | Per cent |
|---|---|
| Al$_2$O$_3$ | 92.2 |
| Loss on ignition | 7 |
| Na$_2$O | 0.1 to 1 |
| SiO$_2$ | .1 |
| Fe$_2$O$_3$ | 0.01 to 0.1 |

While the above-described commercial product is suitably employed, it is, of course, understood that the alumina employed in the preparation of the catalysts of the present invention is not restricted to this particular by-product, and other hard crystalline alumina alpha monohydrates prepared by partial dehydration of crystalline alpha alumina trihydrates having similar characteristics are applicable.

"Crystalline alumina alpha monohydrate prepared by partial dehydration of crystalline alpha alumina trihydrate" differs from other forms of alumina commonly employed as catalyst carriers in several respects. This material, for instance, is a hard crystalline alumina and in this respect is quite distinct from the usual aluminas prepared by precipitating aluminum hydroxide and heating. Furthermore, it is totally different in character and properties from bauxite and diaspore. A characteristic property of "crystalline alumina alpha monohydrate prepared by partial dehydration of crystalline alpha alumina trihydrate" which is not usually possessed by other forms of alumina is the ability to catalyze certain dehydrogenation reactions. "Crystalline alumina alpha monohydrate prepared by partial dehydration of crystalline alpha alumina trihydrate" has recently been found to be an excellent catalyst per se for the dehydrogenation of hydrocarbons at temperatures of about 600° C. Other aluminas, such as those produced from gels, on the other hand, are almost entirely inactive.

"Crystalline alumina alpha monohydrate prepared by partial dehydration of crystalline alpha alumina trihydrate" is not only quite different from the more common aluminas for the present purpose, but also from other common carriers and supporting materials. Thus, such materials as pumice, porcelain chips, majolica chips, silica gel, activated charcoal, diatomaceous earth, pipe clay, and the like, when combined with aluminum halides, yield much inferior catalysts.

The superiority of the present catalysts comprising anhydrous aluminum halides in combination with "crystalline alumina alpha monohydrate prepared by partial dehydration of crystalline alpha alumina trihydrate" is due largely to the particular structure of the surface of this form of alumina and is not simply due to the increased surface area. Thus, although silica gel has an exceedingly large "inner surface" ($2.5 \times 10^6$ cm.$^2$/gm.) and possesses a very large adsorptive capacity, the catalysts prepared with this material are much inferior. This is clearly shown in Example V below.

Although any substantially anhydrous aluminum halide may be employed in the preparation of the present catalysts, aluminum chloride is by far the most practical and preferred. Any substantially anhydrous aluminum chloride, such as the powdered commercial product, is suitable.

The anhydrous aluminum halides may be combined with the "crystalline alumina alpha monohydrate prepared by partial dehydration of crystalline alpha alumina trihydrate," according to the present invention in any of the conventional ways. Thus, the alumina may be finely ground, intimately mixed with the anhydrous powdered aluminum halide, and the resulting mixture pilled, either with or without a binder or other material. The alumina may also, if desired, be employed in the form of granules or pieces of the desired size and impregnated by mixing with finely powdered aluminum halide or by soaking in a non-aqueous solution of the anhydrous aluminum halide.

While the anhydrous aluminum halide may be combined with the "crystalline alumina alpha monohydrate prepared by partial dehydration of crystalline alpha alumina trihydrate" by these conventional ways of preparing supported catalyst, the combination may also be effected in still other ways. Thus, the alumina, in the form of a coarse powder or pieces up to about one inch in diameter, may be placed in a suitable container and allowed to adsorb vapors of the anhydrous aluminum halide. A suitable catalyst may also be prepared by heating a mixture of "crystalline alumina alpha monohydrate prepared by partial dehydration of crystalline alpha alumina trihydrate" and an aluminum halide at a temperature somewhat above the melting point of the aluminum halide, cooling and crushing the resulting cake. Also, the alumina in the form of granules or pieces of the desired size may be dipped into molten aluminum halide. The catalysts prepared by these "hot methods" show exceptionally high activity.

The amount of aluminum halide which is combined with the "crystalline alumina alpha monohydrate prepared by partial dehydration of crystalline alpha alumina trihydrate" may vary within wide limits depending upon the method of preparation, the degree of subdivision of the alumina, etc. By pilling or by fusing, active catalysts may be prepared containing over 90% aluminum chloride. On the other hand, by allowing the "crystalline alumina alpha monohydrate prepared by partial dehydration of crystalline alpha alumina trihydrate" to adsorb vapors of aluminum chloride, active catalysts may be prepared which contain less than 5% aluminum chloride. Catalysts prepared by dipping pieces of "crystalline alumina alpha monohydrate prepared by partial dehydration of crystalline alpha alumina trihydrate" ranging from about 1/8 inch to 1 inch in diameter into molten aluminum chloride usually contain from about 15% to about 40% aluminum chloride, depending upon the temperature employed, the viscosity of the molten aluminum chloride, the time allowed for impregnation, the size of the particles, etc. Generally speaking, catalysts containing from about 10% to about 75% aluminum halide are the most active.

The present catalysts may be employed both in liquid phase and in vapor phase reactions in place of the aluminum halide for the catalyzation of various reactions. They are especially suitable for catalyzing the isomerization of hydrocarbons, such as described in British Patents 498,512 and 498,465, and the alkylation of hydrocarbons, such as described in U. S. Patents 2,112,846 and 2,112,847.

The following examples, which are not to be construed as limitative, are submitted to illustrate the preparation of the present catalysts and the advantageous results which may be realized through their use, illustrated by their application in the vapor phase isomerization of normal butane.

EXAMPLE I

A catalyst containing 25% anhydrous aluminum chloride, 10% "crystalline alumina alpha monohydrate prepared by partial dehydration of crystalline alpha alumina trihydrate" and 65% pumice was prepared by applying a mixture of anhydrous aluminum chloride powder and 80-mesh "crystalline alumina alpha monohydrate prepared by partial dehydration of crystalline alpha alumina trihydrate" to 8- to 10-mesh pumice.

Normal butane vapor was passed at the rate of 3400 cc. per hour along with 280 cc. per hour of hydrogen chloride at atmospheric pressure and a temperature of 135° C. to 140° C. over 240 cc. of this catalyst.

The conversion of normal butane to isobutane was 46.2% and the yield of isobutane (based on the normal butane reacting) was 90%. While this particular catalyst is not especially advantageous due to the poor bond between the catalyst and the pumice, it illustrates the effect of the "crystalline alumina alpha monohydrate prepared by partial dehydration of crystalline alpha alumina trihydrate." By applying an equivalent amount of aluminum chloride directly to the pumice without the "crystalline alumina alpha monohydrate prepared by partial dehydration of crystalline alpha alumina trihydrate," the conversion, under these conditions, is much lower (less than 20%).

EXAMPE II

Two parts by weight of powdered anhydrous aluminum chloride were mixed with one part by weight of 150- to 200-mesh "crystalline alumina alpha monohydrate prepared by partial dehydration of crystalline alpha alumina trihydrate." The mixture was placed in a pressure vessel, subjected to 40 lbs./in. of nitrogen pressure, and heated to about 210° C. The heating was discontinued and the pressure released while cooling, whereupon the molten mass expanded and froze to a hard, porous cake. The cake was removed and broken up into pieces of the desired size in a dry atmosphere.

When normal butane was passed over this catalyst with a small amount of hydrogen chloride at a temperature of 135° C. and at a contact time of about 1.75 minutes, the product was found to contain 52.7% isobutane.

When normal butane containing 2 mol per cent hydrogen chloride was passed over this catalyst at a temperature of only 100° C., at a space velocity of 4.6 mol/liter/hr. and at a pressure of 11 atmospheres, the conversion of normal to isobutane was 54%, and the yield (based on the butane reacted) was 96%.

EXAMPLE III

A catalyst was prepared as described in Example II. Normal butane was isomerized with the aid of this catalyst under the following conditions:

Temperature_____degrees centigrade__ 100
Pressure _____lbs./in.²__ 150
Space velocity _____mol/liter/hr__ 5.4
Hydrogen chloride present___mol per cent__ 2

The isomerization was continued for a total of 318 hours. Although the per cent conversion fluctuated somewhat, it did not fall below 40% at any time and averaged 46% for the entire run.

Since the average conversion of 46% was still prevailing at the end of 318 hours of continuous operation and there was no indication that the catalyst was near exhaustion, the catalyst consumption in this process is very low (3% maximum) when using the catalyst. The catalyst, after 318 hours of operation, was still active, unchanged in appearance (except for a small amount of a tarry deposit near the butane inlet) and still contained at least 85% of the original aluminum chloride.

EXAMPLE IV

"Crystalline alumina alpha monohydrate prepared by partial dehydration of crystalline alpha alumina trihydrate" (6- to 8-mesh) was soaked in molten anhydrous aluminum chloride for 2 hours at 225° C. under pressure, and then drained for 15 minutes under pressure. The catalyst contained 30% aluminum chloride.

Normal butane was isomerized with the aid of this catalyst under the following conditions:

Temperature_____degrees centigrade__ 100
Pressure_____atmospheres__ 11
Space velocity _____mol/liter/hr__ 6
Hydrogen chloride present___mol per cent__ 2

During 126 hours of continuous operation the average isobutane content of the product was 60%. Furthermore, in proportion to the amount of isomerization obtained, the amount of the side reaction products normally present was unusually small.

EXAMPLE V

The remarkable activity of the present catalyst is clearly apparent when the results obtained therewith are compared with the results obtained with catalysts prepared in the same way with various common carrier materials and employed under the same conditions. Such experimental results are tabulated in the following table. The catalysts were all made by soaking the carrier material in molten anhydrous aluminum chloride and tested in the isomerization of normal butane under the conditions shown in Example IV.

Table I

| Carrier material employed | AlCl₃ | Per cent isobutane in product— | |
|---|---|---|---|
| | | After | Isobutane |
| "Crystalline alumina alpha monohydrate prepared by partial dehydration of crystalline alpha alumina trihydrate" | Per cent 30 | Hours 2 | Per cent 66 |
| Do | 30 | 22 | 65 |
| Do | 30 | 162 | 48 |
| Do | 30 | 270 | 40 |
| Pumice | 40 | 2 | 9 |
| Do | 40 | 27 | 7 |
| Silica gel | 23 | 4 | 4 |
| Activated charcoal | 46 | 13 | 27 |
| Sil-O-Cel (a diatomaceous earth) | 33 | 13 | 43 |
| Bauxite | 39 | 5 | 25 |
| Majolica chips | 11 | 4 | 19 |

EXAMPLE VI

A catalyst prepared as described in Example IV and containing 25.7% aluminum chloride was used for the isomerization of normal butane to isobutane under the following conditions:

Temperatures_____ 103–110° C.
Pressure_____ 12 atmospheres
Amount of catalyst_____ 6.1 kgs.=5.7 liter
Amount of hydrogen chloride
  in feed_____ 2.3 mol. percent
Feed rate in kgs. N-butane/
  liter catalyst/hr_____ 0.32

In 553 hours of continuous operation a total of 520 kgs. of isobutane or 138 kgs. of isobutane per pound of aluminum chloride was produced (average conversion of 47%). The catalyst at the end of 553 hours of operation was substantially unchanged in appearance and still quite active. In this experiment a liter of adsorptive alumina was placed in the line of flow just beyond the catalyst. This adsorptive alumina adsorbed substantially all of the aluminum chloride vapors from the exit gas; consequently, when the experiment was stopped at the end of 553 hours of continuous operation, substantially all of the original aluminum chloride was found to have remained in the reaction chamber.

EXAMPLE VII

"Crystalline alumina alpha monohydrate prepared by partial dehydration of crystalline alpha alumina trihydrate" in the form of pieces of 6- to 8-mesh was impregnated at 220° C. and under pressure by means of vapors of anhydrous aluminum chloride. The catalyst contained 23.5% aluminum chloride.

When this catalyst was used in the isomerization of normal butane under conditions shown in Example IV, the isobutane content of the product after four hours of operation was 65% and was still 44% after 361 hours of continuous operation.

EXAMPLE VIII

"Crystalline alumina alpha monohydrate prepared by partial dehydration of crystalline alpha alumina trihydrate" in the form of pieces of 6- to 8-mesh was heated to 220° C. to 250° C. in a suitable container while passing vapors of anhydrous aluminum chloride therethrough at atmospheric pressure. The catalyst contained 15% aluminum chloride.

When this catalyst was used in the isomerization of normal butane under the conditions shown in Example IV, the isobutane content in the product was 66% after four hours, 50% after 119 hours and 44% after 181 hours of continuous use.

The conversions of normal butane to isobutane obtained with the present promoted catalysts, as shown in the above examples, are exceptionally high and, in fact, very near to the maximum conversion possible at these temperatures. Thus, substantially the same product is obtained when starting with either normal butane or isobutane. This is illustrated in the following example:

EXAMPLE IX

Normal butane and isobutane were each passed separately over "crystalline alumina alpha monohydrate prepared by partial dehydration of crystalline alpha alumina trihydrate" catalysts containing 30% aluminum chloride under the conditions shown in Example IV. The results were as follows:

| Product | Starting with N-butane | Starting with isobutane |
|---|---|---|
| Mol per cent isobutane | 65.3 | 65.0 |
| Mol per cent N-butane | 26.1 | 25.8 |
| Ratio isobutane/N-butane | 2.50 | 2.52 |

The present catalyst, as can be seen from the examples, not only possesses outstanding activity, but maintains its activity for long periods of time. When, after a long period of use, the catalytic activity of the present catalysts finally becomes too low for practical use, the "crystalline alumina alpha monohydrate prepared by partial dehydration of crystalline alpha alumina trihydrate" which is the more costly ingredient of the present catalyst, may be recovered and reused, or in some cases the catalyst may be regenerated. Thus, for example, the degenerated catalyst may be treated with a suitable solvent such as water, aqueous acid, aqueous solutions of methyl ethyl ketone, isopropyl ether, etc., to remove the aluminum halide and impurities. The recovered "crystalline alumina alpha monohydrate prepared by partial dehydration of crystalline alpha alumina trihydrate" may then be recombined with fresh aluminum halide.

We claim as our invention:

1. A solid catalyst comprising an anhydrous aluminum halide promoted by and supported upon crystalline alumina alpha monohydrate prepared by partial dehydration of crystalline alpha alumina trihydrate precipitated from a solution of sodium aluminate.

2. A solid catalyst comprising anhydrous aluminum chloride promoted by and supported upon crystalline alumina alpha monohydrate prepared by partial dehydration of crystalline alpha alumina trihydrate precipitated from a solution of sodium aluminate.

3. A solid catalyst comprising an anhydrous aluminum halide in intimate association with crystalline alumina alpha monohydrate prepared by partial dehydration of crystalline alpha alumina trihydrate.

4. A solid catalyst in the form of fragments or granules of suitable size and shape comprising anhydrous aluminum chloride in intimate association with crystalline alumina alpha monohydrate prepared by partial dehydration of crystalline alpha alumina trihydrate.

5. A solid catalyst comprising pieces or fragments of crystalline alumina alpha monohydrate prepared by partial dehydration of crystalline alpha alumina trihydrate impregnated with an anhydrous aluminum halide.

6. A solid catalyst comprising pieces or fragments of crystalline alumina alpha monohydrate prepared by partial dehydration of crystalline alpha alumina trihydrate impregnated with anhydrous aluminum chloride.

7. A solid catalyst comprising pieces or fragments of crystalline alumina alpha monohydrate prepared by partial dehydration of crystalline alpha alumina trihydrate impregnated with anhydrous aluminum bromide.

MARTIN DE SIMÓ.
FRANK MATTHEW McMILLAN.